United States Patent
Hassani et al.

(10) Patent No.: US 12,406,484 B2
(45) Date of Patent: Sep. 2, 2025

(54) BIOMETRIC TASK NETWORK

(71) Applicant: Ford Global Technologies, LLC, Dearborn, MI (US)

(72) Inventors: Ali Hassani, Ann Arbor, MI (US); Zaid El Shair, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 550 days.

(21) Appl. No.: 17/730,315

(22) Filed: Apr. 27, 2022

(65) Prior Publication Data

US 2023/0260269 A1    Aug. 17, 2023

Related U.S. Application Data

(60) Provisional application No. 63/310,401, filed on Feb. 15, 2022.

(51) Int. Cl.
*G06V 10/82* (2022.01)
*G06V 40/16* (2022.01)
*G06V 40/40* (2022.01)

(52) U.S. Cl.
CPC ............ *G06V 10/82* (2022.01); *G06V 40/168* (2022.01); *G06V 40/172* (2022.01); *G06V 40/45* (2022.01)

(58) Field of Classification Search
None
See application file for complete search history.

(56) References Cited

U.S. PATENT DOCUMENTS

| | | |
|---|---|---|
| 7,797,803 B2 | 9/2010 | Falb et al. |
| 10,179,563 B2 | 1/2019 | Ammons |

(Continued)

FOREIGN PATENT DOCUMENTS

| | | |
|---|---|---|
| CN | 106529402 B | 5/2019 |
| CN | 110930982 A | 3/2020 |

(Continued)

OTHER PUBLICATIONS

T. Devries, K. Biswaranjan and G. W. Taylor, "Multi-task Learning of Facial Landmarks and Expression," 2014 Canadian Conference on Computer and Robot Vision, 2014, pp. 98-103, doi: 10.1109/CRV.2014.21.

(Continued)

*Primary Examiner* — Vikkram Bali
(74) *Attorney, Agent, or Firm* — Frank Lollo; Brooks Kushman P.C.

(57) ABSTRACT

A selected biometric analysis task is performed in a deep neural network that includes a common feature extraction neural network, a plurality of task-specific neural networks, a segmentation neural network, a landmark mesh neural network, a plurality of soft target segmentation neural networks, and a plurality of expert pooling neural networks that perform the plurality of biometric analysis tasks by inputting the image to the common feature extraction network to determine latent variables. The latent variables can be input to the plurality of biometric task-specific neural networks to determine a plurality of first biometric analysis task outputs. The latent variables can be input to a landmark mesh neural network to determine a landmark mesh. The landmark mesh (Continued)

and the first biometric task outputs to a plurality of expert pooling neural networks to determine a plurality of second biometric task outputs.

20 Claims, 11 Drawing Sheets

(56) References Cited

U.S. PATENT DOCUMENTS

| | | | |
|---|---|---|---|
| 10,747,989 B2 | 8/2020 | Zou et al. | |
| 10,860,837 B2 | 12/2020 | Ranjan et al. | |
| 2018/0060648 A1 | 3/2018 | Yoo et al. | |
| 2018/0365532 A1* | 12/2018 | Molchanov | G06V 40/162 |
| 2020/0210688 A1 | 7/2020 | Xu | |
| 2020/0394390 A1 | 12/2020 | Zhang et al. | |
| 2021/0117984 A1 | 4/2021 | Sharma et al. | |
| 2021/0150240 A1 | 5/2021 | Yu et al. | |
| 2022/0406090 A1* | 12/2022 | Liu | G06N 3/0455 |
| 2023/0063229 A1 | 3/2023 | Vemulapalli et al. | |
| 2023/0074706 A1* | 3/2023 | Xiao | G06V 30/1444 |
| 2023/0154090 A1 | 5/2023 | Bradley et al. | |
| 2023/0206700 A1* | 6/2023 | Khan | G06V 40/165 382/116 |
| 2023/0206925 A1 | 6/2023 | Havdan et al. | |

FOREIGN PATENT DOCUMENTS

| | | |
|---|---|---|
| CN | 111539480 A | 8/2020 |
| CN | 11065977 B | 6/2021 |
| CN | 110659744 B | 6/2021 |
| EP | 4177822 A1 | 5/2023 |
| KR | 101579288 B1 | 12/2015 |
| WO | 2016026063 A1 | 2/2016 |
| WO | 2022003107 A1 | 1/2022 |

OTHER PUBLICATIONS

Devries et al., "Multi-Task Learning of Facial Landmarks and Expression", 2014 Canadian Conference on Computer and Robot Vision, DOI: 10.1109/CRV.2014.21, Electronic ISBN:978-1-4799-4337-1, CD:978-1-4799-4338-8.
Notice of Allowance dated Aug. 23, 2023 re U.S. Appl. No. 17/730,324, filed Apr. 27, 2022.
Non-Final Office Action dated Oct. 8, 2024 re U.S. Appl. No. 17/730,294, filed Apr. 27, 2022.
Final Office Action dated Oct. 8, 2024 re U.S. Appl. No. 17/730,301, filed Apr. 27, 2022.
Notice of Allowance dated Feb. 14, 2025 re U.S. Appl. No. 17/730,301, filed Apr. 27, 2022.
Non-Final Office Action dated Jun. 2, 2025 re U.S. Appl. No. 17/730,294, filed Apr. 27, 2022.

\* cited by examiner

BIOMETRIC TASK NETWORK

CROSS-REFERENCE TO RELATED APPLICATION

This patent application claims priority to U.S. Provisional Patent Application No. 63/310,401 filed on Feb. 15, 2022, which is hereby incorporated by reference in its entirety.

BACKGROUND

Images can be acquired by sensors and processed using a computer to determine data regarding objects in an environment around a system. Operation of a sensing system can include acquiring accurate and timely data regarding objects in the system's environment. A computer can acquire images from one or more image sensors that can be processed to determine data regarding objects. Data extracted from images of objects can be used by a computer to operate systems including vehicles, robots, security, and object tracking systems.

DETAILED DESCRIPTION

Figure 1:
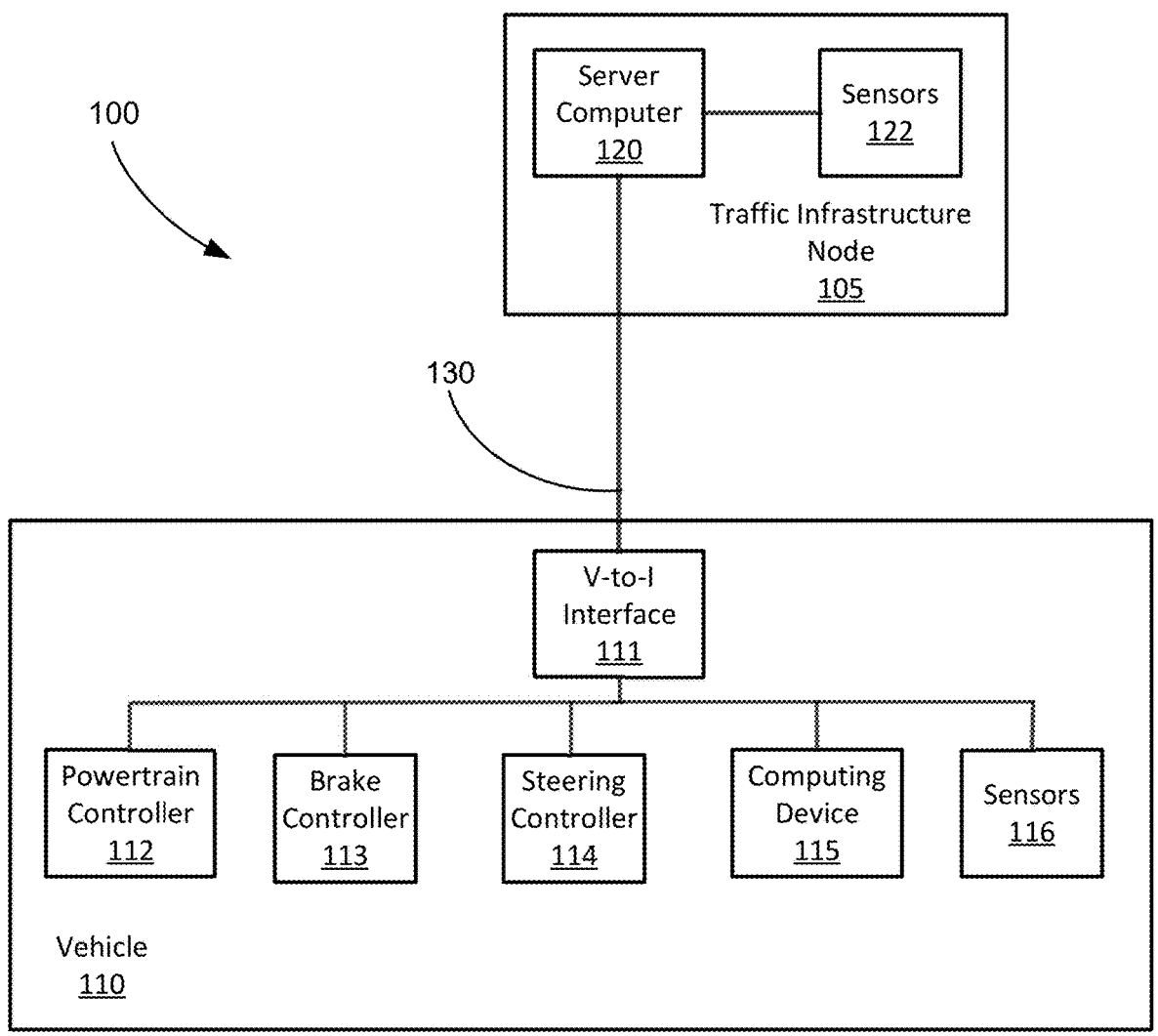
FIG. 1 is a block diagram of an example traffic infrastructure system.

Biometric analysis can be implemented in a computer to determine data regarding objects, for example potential users, in or around system or machine, such as a vehicle. Based on data determined from biometric analysis a vehicle, for example, can be operated. Biometric analysis herein means measuring, or making a determination based on measuring, data regarding a user based on physical characteristics of the user. For example, a computing device in a vehicle or traffic infrastructure system can be programmed to acquire one or more images from one or more sensors included in the vehicle or the traffic infrastructure system and grant permission for a user to operate the vehicle based on biometric data determined based on the images. This granting of permission is referred to herein as biometric identification. Biometric identification means determining the identity of a potential user based on analyzing biometric data. The determined identity of a user can be logged to keep track of which user is accessing a vehicle or compared to a list of authorized users to authenticate a user prior to granting permission to the user to operate a vehicle or system. In addition to biometric identification, biometric analysis can include determining one or more physical characteristics such as user drowsiness, gaze direction, user pose, user liveliness, etc. Biometric analysis tasks can be implemented in various other machines or systems, in addition to vehicles. For example, a computer system, a robot system, a manufacturing system, and a security system can require that a potential user be identified using an acquired image before granting access to the system or a secure area.

Advantageously, techniques described herein can enhance the ability of a computing device in a traffic infrastructure system to perform biometric analysis based on a recognition that facial biometric algorithms such as facial feature identification include redundant tasks across different applications. Further, some facial biometric algorithms have sparse or limited training datasets. Techniques described herein include a multi-task network that includes a common feature identification neural network and a plurality of biometric analysis task neural networks. A deep neural network is configured to include a common feature extraction neural network as a "backbone" and a plurality of biometric analysis task neural networks that receive as input a common set of latent variables generated by the common feature extraction neural network. The deep neural network includes a plurality of expert pooling deep neural networks that training of the deep neural network by sharing results between the plurality of biometric analysis tasks.

Performing biometric task analysis in a neural network can benefit from data regarding facial landmarks. Facial landmarks are key locations on an image of a user's face. Inside and outside corners of left and right eyes, left and right corners of lips, locations where the widest points of the nose joint the cheeks, and inside and outside corners of left and right eyebrows are all examples of facial landmarks. Polygons can be constructed based on the landmarks that indicate a soft target estimate of the locations of facial features. The soft target estimate of the locations of facial features can be input to segmentation neural networks and biometric task analysis neural networks as conditioning values. Inputting the soft target estimates can training of the segmentation neural networks and biometric task analysis neural networks by reducing the number of processing runs for output of the deep neural network to converge on correct results. Inputting the soft target estimates can operation of the segmentation neural networks and biometric task analysis neural networks at inference time by increasing the accuracy of the predictions output by the deep neural network while reducing a number of computer operations required to reach the predictions.

Disclosed herein is a method, including providing output from a selected biometric analysis task that is one of a plurality of biometric analysis tasks, based on an image provided from an image sensor wherein the selected biometric analysis task is performed in a deep neural network that includes a common feature extraction neural network, a plurality of biometric task-specific neural networks, a segmentation neural network, a landmark mesh neural network, a plurality of soft target segmentation neural networks, and a plurality of expert pooling neural networks that perform the plurality of biometric analysis tasks by inputting the image to the common feature extraction network to determine latent variables. The latent variables can be input to the plurality of biometric task-specific neural networks to determine a plurality of first biometric analysis task outputs. The latent variables can be input to a landmark mesh neural network to determine a landmark mesh and the landmark mesh and the first biometric task outputs can be input to a plurality of expert pooling neural networks to determine a plurality of second biometric task outputs. The plurality of biometric tasks can be performed by inputting the latent variables to the segmentation neural network to determine a first estimate segmentation map, inputting the landmark mesh to the plurality of soft target segmentation neural networks to determine a plurality of soft target estimates and inputting the first estimate segmentation map and the plurality of soft target estimates to an expert pooling neural network to determine a segmentation prediction.

The output from the landmark mesh neural network can be stored in a memory and processed to determine temporal data regarding one or more image segments. A device can be operated based on the output from the deep neural network according to the selected biometric analysis task. The biometric analysis tasks can include biometric identification, liveliness, and facial segmentation. The common feature extraction neural network can include a plurality of convolutional layers. The plurality of task-specific neural networks can include a plurality of fully connected layers. The segmentation neural network, the landmark mesh neural network, and the plurality of expert pooling neural networks can include a plurality of fully connected layers. The outputs from the plurality of task-specific neural networks can be input to a Softmax function before being combined with the outputs from the common feature extraction neural network. The outputs from the common feature extraction neural network can be combined with the soft target estimates using expert pooling. The deep neural network can be trained by determining one or more first loss functions based on the plurality of second biometric task outputs, combining the first loss functions to determine a joint loss function, and backpropagating the one or more first loss function and the joint loss function back through the deep neural network. Output from the expert pooling can be input to a Softmax function before being combined to determine the first loss functions. One or more outputs from the plurality of task-specific neural networks can be set to zero during training. The deep neural network can be trained based on a loss function determined based on sparse-categorical-cross-entropy statistics.

Further disclosed is a computer readable medium, storing program instructions for executing some or all of the above method steps. Further disclosed is a computer programmed for executing some or all of the above method steps, including a computer apparatus, programmed to provide output from a selected biometric analysis task that is one of a plurality of biometric analysis tasks, based on an image provided from an image sensor wherein the selected biometric analysis task is performed in a deep neural network that includes a common feature extraction neural network, a plurality of biometric task-specific neural networks, a segmentation neural network, a landmark mesh neural network, a plurality of soft target segmentation neural networks, and a plurality of expert pooling neural networks that perform the plurality of biometric analysis tasks by inputting the image to the common feature extraction network to determine latent variables. The latent variables can be input to the plurality of biometric task-specific neural networks to determine a plurality of first biometric analysis task outputs. The latent variables can be input to a landmark mesh neural network to determine a landmark mesh and the landmark mesh and the first biometric task outputs can be input to a plurality of expert pooling neural networks to determine a plurality of second biometric task outputs. The plurality of biometric tasks can be performed by inputting the latent variables to the segmentation neural network to determine a first estimate segmentation map, inputting the landmark mesh to the plurality of soft target segmentation neural networks to determine a plurality of soft target estimates and inputting the first estimate segmentation map and the plurality of soft target estimates to an expert pooling neural network to determine a segmentation prediction.

The instructions can include further instructions to store the output from the landmark mesh neural network in a memory and process the output to determine temporal data regarding one or more image segments. A device can be operated based on the output from the deep neural network according to the selected biometric analysis task. The biometric analysis tasks can include biometric identification, liveliness, and facial segmentation. The common feature extraction neural network can include a plurality of convolutional layers. The plurality of task-specific neural networks can include a plurality of fully connected layers. The segmentation neural network, the landmark mesh neural network, and the plurality of expert pooling neural networks can include a plurality of fully connected layers. The outputs from the plurality of task-specific neural networks can be input to a Softmax function before being combined with the outputs from the common feature extraction neural network. The outputs from the common feature extraction neural network can be combined with the soft target estimates using expert pooling. The deep neural network can be trained by determining one or more first loss functions based on the plurality of second biometric task outputs, combining the first loss functions to determine a joint loss function, and backpropagating the one or more first loss function and the joint loss function back through the deep neural network. Output from the expert pooling can be input to a Softmax function before being combined to determine the first loss functions. One or more outputs from the plurality of task-specific neural networks can be set to zero during training. The deep neural network can be trained based on a loss function determined based on sparse-categorical-cross-entropy statistics.

FIG. 1 is a diagram of a sensing system 100 that can include a traffic infrastructure node 105 that includes a server computer 120 and stationary sensors 122. Sensing system 100 includes a vehicle 110, operable in autonomous ("autonomous" by itself in this disclosure means "fully autonomous"), semi-autonomous, and occupant piloted (also referred to as non-autonomous) mode. One or more vehicle 110 computing devices 115 can receive data regarding the operation of the vehicle 110 from sensors 116. The computing device 115 may operate the vehicle 110 in an autonomous mode, a semi-autonomous mode, or a non-autonomous mode.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (i.e., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, i.e., via a vehicle communications bus as described further below, more than one computing devices, i.e., controllers or the like included in the vehicle 110 for monitoring and/or controlling various vehicle components, i.e., a powertrain controller 112, a brake controller 113, a steering controller 114, etc. The computing device 115 is generally arranged for communications on a vehicle communication network, i.e., including a bus in the vehicle 110 such as a controller area network (CAN) or the like; the vehicle 110 network can additionally or alternatively include wired or wireless communication mechanisms such as are known, i.e., Ethernet or other communication protocols.

Via the vehicle network, the computing device 115 may transmit messages to various devices in the vehicle and/or receive messages from the various devices, i.e., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, i.e., a cloud server, via a network 130, which, as described below, includes hardware, firmware, and software that permits computing device 115 to communicate with a remote server computer 120 via a network 130 such as wireless Internet (WI-FI®) or cellular networks. V-to-I interface 111 may accordingly include processors, memory, transceivers, etc., configured to utilize various wired and/or wireless networking technologies, i.e., cellular, BLUETOOTH® and wired and/or wireless packet networks. Computing device 115 may be configured for communicating with other vehicles 110 through V-to-I interface 111 using vehicle-to-vehicle (V-to-V) networks, i.e., according to Dedicated Short Range Communications (DSRC) and/or the like, i.e., formed on an ad hoc basis among nearby vehicles 110 or formed through infrastructure-based networks. The computing device 115 also includes nonvolatile memory such as is known. Computing device 115 can log data by storing the data in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executable by the processor of the computing device 115 is programming for operating one or more vehicle 110 components, i.e., braking, steering, propulsion, etc., without intervention of a human operator. Using data received in the computing device 115, i.e., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to monitor and/or control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computing device 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously, for example.

The vehicle 110 is generally a land-based vehicle 110 capable of autonomous and/or semi-autonomous operation and having three or more wheels, i.e., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, i.e., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, i.e., sensors 116 can detect phenomena such as weather conditions (precipitation, external ambient temperature, etc.), the grade of a road, the location of a road (i.e., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Vehicles can be equipped to operate in both autonomous and occupant piloted mode. By a semi- or fully-autonomous mode, we mean a mode of operation wherein a vehicle can be piloted partly or entirely by a computing device as part of a system having sensors and controllers. The vehicle can be occupied or unoccupied, but in either case the vehicle can be partly or completely piloted without assistance of an occupant. For purposes of this disclosure, an autonomous mode is defined as one in which each of vehicle propulsion (i.e., via a powertrain including an internal combustion engine and/or electric motor), braking, and steering are controlled by one or more vehicle computers; in a semi-autonomous mode the vehicle computer(s) control(s) one or more of vehicle propulsion, braking, and steering. In a non-autonomous mode, none of these are controlled by a computer.

A traffic infrastructure node 105 can include a physical structure such as a tower or other support structure (i.e., a pole, a box mountable to a bridge support, cell phone tower, road sign support, etc.) on which infrastructure sensors 122, as well as server computer 120 can be mounted, stored, and/or contained, and powered, etc. One traffic infrastructure node 105 is shown in FIG. 1 for ease of illustration, but the system 100 could and likely would include tens, hundreds, or thousands of traffic infrastructure nodes 105. The traffic infrastructure node 105 is typically stationary, i.e., fixed to and not able to move from a specific geographic location. The infrastructure sensors 122 may include one or more sensors such as described above for the vehicle 110 sensors 116, i.e., lidar, radar, cameras, ultrasonic sensors, etc. The infrastructure sensors 122 are fixed or stationary. That is, each sensor 122 is mounted to the infrastructure node so as to have a substantially unmoving and unchanging field of view.

Server computer 120 typically has features in common with the vehicle 110 V-to-I interface 111 and computing device 115, and therefore will not be described further to avoid redundancy. Although not shown for ease of illustration, the traffic infrastructure node 105 also includes a power source such as a battery, solar power cells, and/or a connection to a power grid. A traffic infrastructure node 105 server computer 120 and/or vehicle 110 computer 115 can receive sensor 116, 122 data to monitor one or more objects. An "object," in the context of this disclosure, is a physical, i.e., material, structure detected by a vehicle sensor 116 and/or infrastructure sensor 122. An object may be a biological object such as a human. A server computer 120 and/or computing device 115 can perform biometric analysis on object data acquired by a sensor 116/122.

Figure 2:
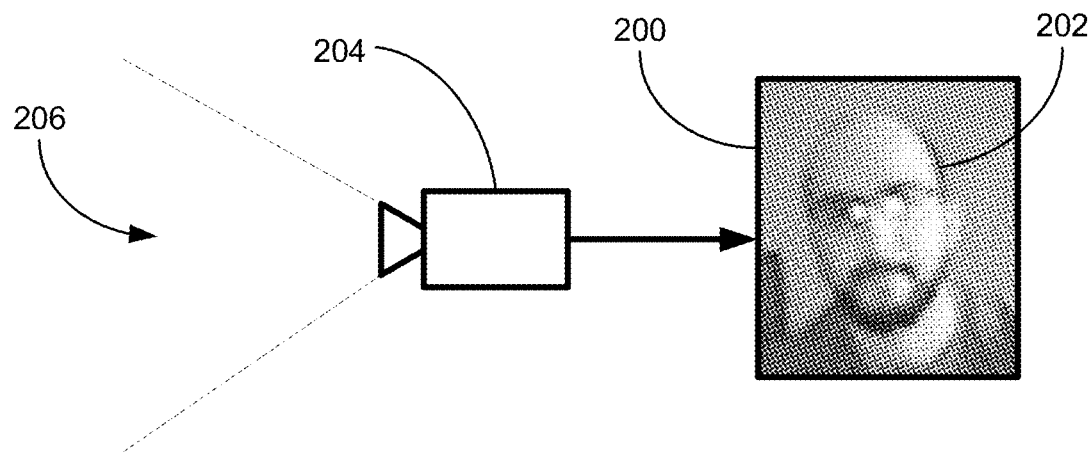
FIG. 2 is a diagram of an example biometric image.

FIG. 2 is a diagram of an image acquisition system 200 included in a vehicle 110 or traffic infrastructure node 105. Image 202 can be acquired by a camera 204, which can be a sensor 116, 122, having a field of view 206. The image 202 can be acquired when a user approaches a vehicle 110, for example. A computing device 115 in the vehicle 110 or a server computer 120 can execute a biometric analysis task that authenticates the user and grants permission to the user to operate the vehicle 110, i.e., unlocks a door to permit the user to enter the vehicle 110. In addition to biometric identification, spoof detection biometric analysis tasks such as liveliness detection can be used to determine whether the image data presented for user identification is a real image of a real user, i.e., not a photograph of a user or not a mask of a user.

Other biometric analysis tasks based on images of a user as are known in the art include drowsiness detection, head pose detection, gaze detection, and emotion detection. Drowsiness detection can determine a user's state of alertness typically by analyzing eyelid position and blink rates. Head pose detection can also determine a user's state of alertness and attention to vehicle operation, typically by analyzing location and orientation of a user's face to detect nodding and slumping postures. Gaze detection can determine the direction in which a user's eyes are looking to determine whether the user is paying attention to vehicle operation. Emotion detection can determine an emotional state of a user, i.e., is a user agitated or frightened, to detect possible distractions from vehicle operation.

Figure 3:
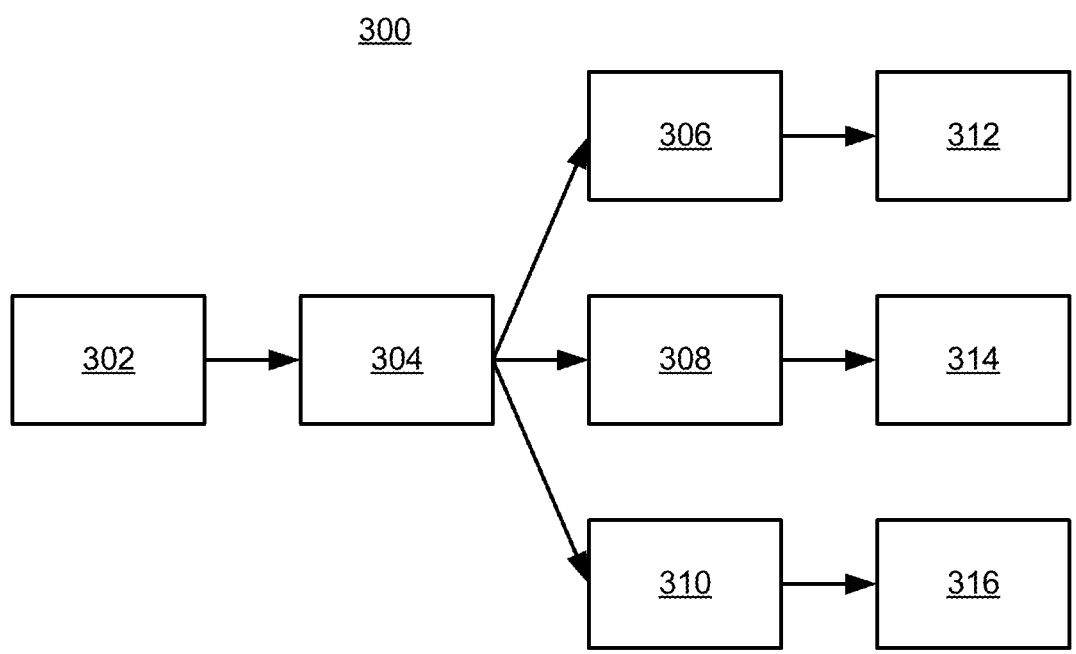
FIG. 3 is a diagram of an example biometric system.

FIG. 3 is a diagram of a biometric analysis task system 300. A biometric analysis task system 300 can be implemented on a server computer 120 or computing device 115. Biometric analysis tasks including user identification, spoof detection, drowsiness detection, head pose detection, and gaze detection share common computational tasks 304, such as determining a location and orientation of a user's face in an image 302. Other common computational tasks include determining location and size of facial features such as eyes, mouth, and nose. FIG. 3 illustrates an image 302 being input to common computational tasks 304 to determine common facial feature data such as location, orientation, and features, for example. The common facial feature data can be input to biometric analysis tasks 306, 308, 310 to determine biometric tasks outputs 312, 314, 316. The biometric task outputs can be 312, 314, 316 one or more of user identification, spoof detection, drowsiness detection, head pose detection, gaze detection, and emotion detection etc.

Figure 4:
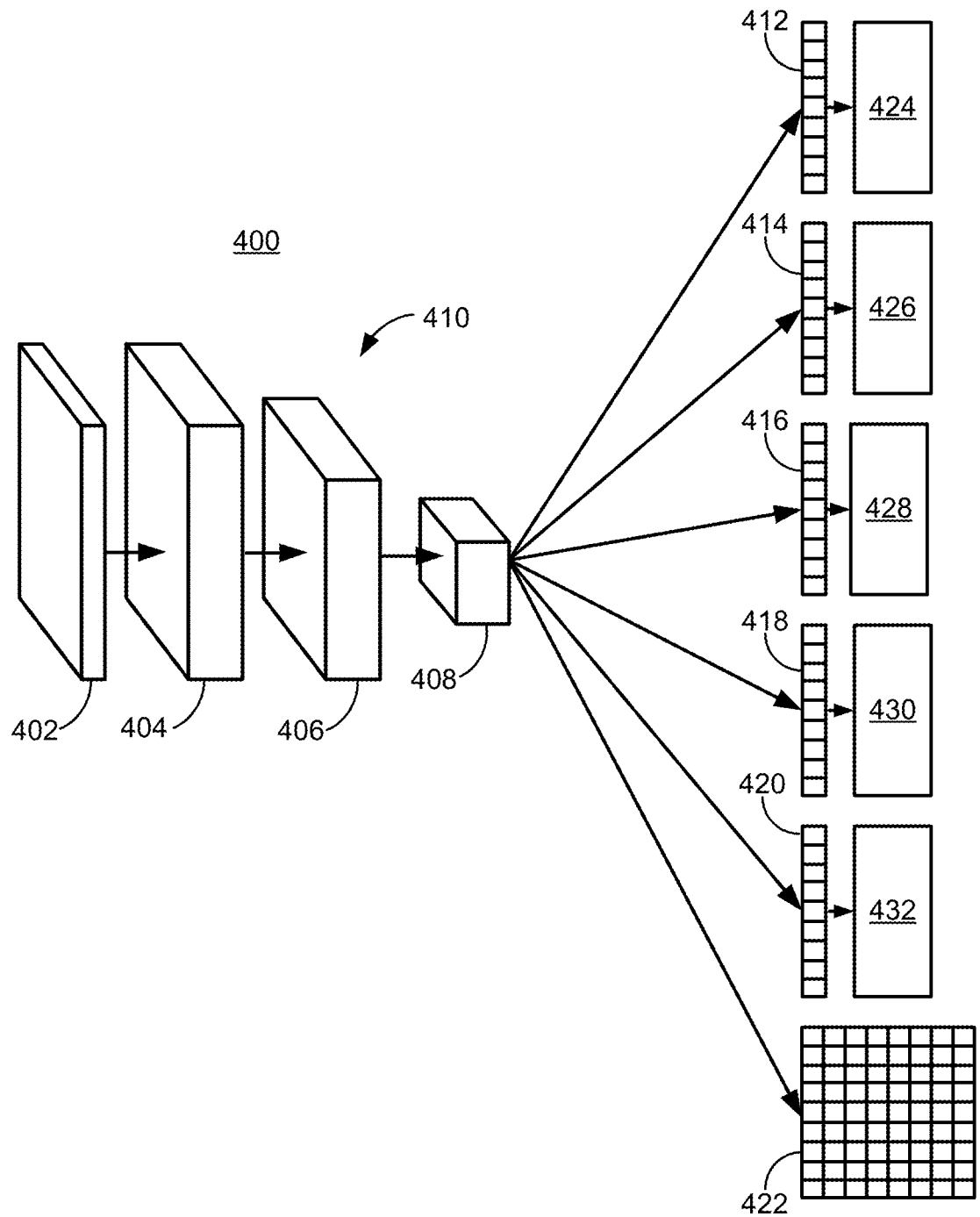
FIG. 4 is a diagram of an example multi-task biometric system.

FIG. 4 is a diagram of a biometric analysis task system implemented as a deep neural network (DNN) 400 configured to input an image 402 into a plurality of convolutional layers 404, 406, 408 that are included in a common feature extraction convolutional neural network (CNN) 410. A biometric analysis task system implemented as a DNN 400 can be executed on a server computer 120 or computing device 115. The common feature extraction or "backbone" CNN 410 extracts common facial features from image data and outputs latent variables. Latent variables are common facial features output by CNN 410 in response to an input image 402 that includes a human face. CNN 410 is trained as described herein to process an image 402 to determine the location of a human face and determine facial features indicating the location, orientation, and size of human facial features such as eyes, nose, and mouth. CNN 410 can also determine facial features such as skin tone, texture and presence/absence of facial hair, and presence/absence of objects such as glasses and body piercings. The facial features are referred to as common facial features because they are output as latent variables in common to a plurality of biometric analysis task neural networks 412, 414, 416, 418, 420 and a segmentation neural network 422. Biometric analysis task neural networks 412, 414, 416, 418, 420 include a plurality of fully connected layers that can perform tasks such as biometric identification, spoof detection including liveliness, drowsiness detection, head pose detection, gaze detection, and emotion detection. Segmentation neural network 422 can perform facial feature segmentation by determining regions in an image of a user's face that can include features such as eyes, teeth, lips, nose, and facial skin, for example.

Biometric analysis task neural networks 412, 414, 416, 418, 420 and segmentation neural network 422 are trained to output predictions regarding the biometric analysis tasks or segmentation task based on latent variables output from the common feature extraction CNN 410. Predictions output from the biometric analysis tasks include biometric identification of a user. A biometric identification prediction is a probability that an input image includes a human face that matches a human face that the DNN 400 was previously trained to recognize. A liveliness prediction is a probability that the image 402 includes a live user, as opposed to a photograph or mask of a user. A drowsiness prediction is a probability that the image 402 includes a user experiencing drowsiness. A head pose prediction are estimates of the roll, pitch, and yaw of a user's head. An emotion prediction is a probability that the user is experiencing a strong emotion such as anger or fear. A facial segmentation prediction is an image with regions which indicate the locations of facial features.

DNN 400 can include SoftMax functions 424, 426, 428, 430, 432 on the output of the biometric analysis task neural networks 412, 414, 416, 418, 420, respectively. The SoftMax functions 424, 426, 428, 430, 432 are functions that turn a vector of K real values into a vector of K real values between 0 and 1 that sum to 1. Output from the SoftMax functions 424, 426, 428, 430, 432 can be output as results of the biometric analysis tasks or used to calculate loss functions. Processing the outputs of the biometric analysis task neural networks 412, 414, 416, 418, 420 with SoftMax functions 424, 426, 428, 430, 432 permits the outputs to be combined into a joint loss function for training the DNN 400. A loss function compares the output from a SoftMax function 424, 426, 428, 430, 432 connected to a biometric analysis task neural network 412, 414, 416, 418, 420 with a ground truth value to determine how closely the biometric analysis task neural network has come to determining a correct result. A SoftMax function 424, 426, 428, 430, 432, by limiting the output from each biometric analysis task neural network 412, 414, 416, 418, 420 to values between 0 and 1 prevents one or more of the outputs from dominating the calculation of a joint loss function due to numerical differences in the outputs. A joint loss function is determined by combining the individual loss functions for each biometric analysis task neural network 412, 414, 416, 418, 420, typically by adding the individual loss functions together.

Training a DNN 400 can include determining a training dataset of images 402 and ground truth for each image 402. Determining ground truth can include inspecting the images 402 in the training dataset and estimating the correct result to be expected from a SoftMax function 424, 426, 428, 430, 432 connected to a biometric analysis task neural network 412, 414, 416, 418, 420. During training an image 402 can be input to the DNN 400 a plurality of times. Each time the image 402 is input, weights or parameters that control the operation of the convolutional layers 404, 406, 408, of the CNN 410 and the fully connected layers of the biometric analysis task neural networks 412, 414, 416, 418, 420 can be altered and a joint loss function based on the outputs and the ground truth values for each output can be determined. The joint loss function can be backpropagated through the DNN 400 to select the weights for each layer that result in the lowest joint loss, i.e., the most correct results. Backpropagation is a process for applying the joint loss function to the weights of the DNN 400 layers starting at the layers closest to the output and progressing back to the layers closest to the input. By processing a plurality of input images 402 including ground truth in the training dataset a plurality of times, a set of weights for the layers of the DNN 400 can be selected that converge on correct results for the entire training dataset the DNN 400 can be determined. Selecting an optimum set of weights in this fashion is referred to as training the DNN 400.

Segmentation determines regions in an image indicating the different facial features. Segmentation labels the regions according to segment classes, where each segment class indicates a different facial feature. Example segment classes include left eye, right eye, teeth, upper lip, lower lip, nose, facial skin, left eyebrow, right eyebrow, etc. The number of facial segmentation classes can be equal to 14 or more for a typical segmentation neural network 422. Each segment is further specified by its location, shape, and number of pixels included in the segment. In determining a loss function, the segments in a predicted segmented image output by segmentation neural network 422 can be compared to the segments in a ground truth segmented image. Comparing segments includes determining that the pixels of a predicted segment overlap with the pixels of a ground truth segment having the same class designation. The comparison can be qualitative, based on sparse-categorical-cross-entropy statistics, which requires that a percentage, for example 50%, of the ground truth segment pixels are overlapped with a predicted segment with the same class designation. In other examples the comparison can be quantitative, based on mean-square-error statistics which count the number of non-overlapped pixels in the ground truth segments and take the square of the number of non-overlapped pixels.

Training the DNN 400 using a joint loss function can advantageously compensate for differences in training datasets for each biometric analysis task. The quality of training for a biometric task can be dependent upon the number of images available with appropriate ground truth for each biometric analysis task. For example, biometric identification tasks can benefit from the existence of large commercially available datasets that include ground truth. Other biometric analysis tasks, such as drowsiness determination or gaze determination can require that a user acquire image data and estimate ground truth manually. Advantageously, training DNN 400 using a joint loss function determined as discussed herein can permit sharing training datasets between biometric analysis tasks having large training datasets with biometric analysis tasks having smaller training datasets. For example, the individual loss functions can be weighted as they are combined to form a joint loss function to give more weight to loss functions that include larger training datasets.

In examples where one or more of the biometric analysis tasks can have small amounts of ground truth data to include in a training dataset, training the DNN 400 can be d by branch training isolation. Branch training isolation sets the output from a biometric analysis task neural network having no ground truth data for a particular image in a training dataset to a null value. Setting the output from a biometric analysis task neural network to a null value also sets the loss function determined for the biometric analysis task neural network to zero. Branch training isolation also freezes the weights included in the biometric analysis task neural network for that image. This permits the biometric analysis task neural network to be available for joint training along with the rest of the DNN 400 without penalizing biometric analysis tasks with sparse training datasets. For example, drowsiness detection typically has fewer images with ground truth than identification tasks.

Figure 5:
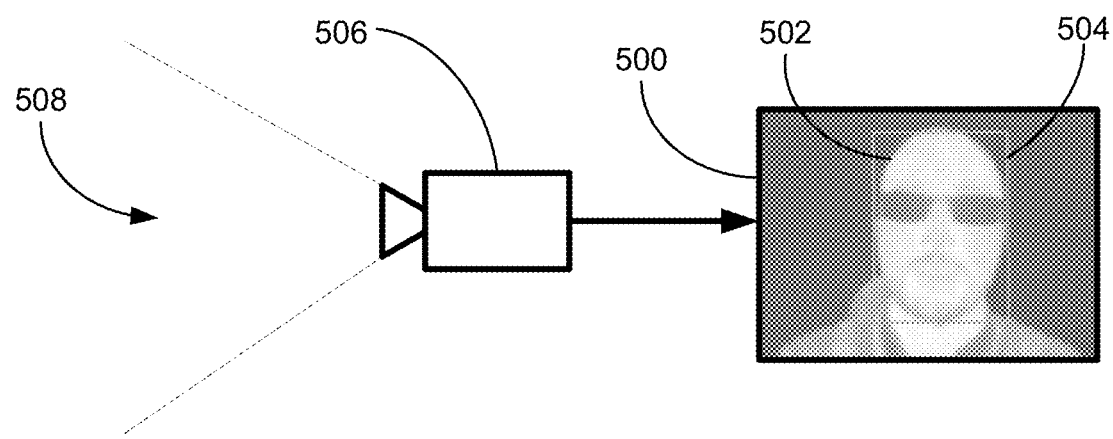
FIG. 5 is a diagram of an example spoofed biometric image.

FIG. 5 is a diagram of an image acquisition system 500 included in a vehicle 110 or traffic infrastructure node 105. Spoofed image 502 can be acquired by a camera 504, which can be a sensor 116, 122, having a field of view 508. The image 502 has been acquired of a user wearing a spandex mask to appear as an authorized user (i.e., to spoof the user) of a vehicle. A computing device 115 in the vehicle 110 or a server computer 120 can execute a biometric analysis task that authenticates the user and grants permission to the user to operate the vehicle 110, i.e., unlocks a door to permit the user to enter the vehicle 110. In addition to biometric identification, spoof detection biometric analysis tasks such as liveliness detection can be used to determine whether the image data presented for user identification is a real image of a real user, i.e., not a photograph of a user or not a mask of a user. Without liveness detection a biometric identification system can be spoofed into granting access to an unauthorized user.

Other techniques for anti-spoofing detection exist. For example, a 3D or depth scanner such as a lidar scanner can be employed in addition to a camera to acquire data of a potential user. The 3D scanner can detect the difference between a flat photograph and a human face. A thermal or far-infrared camera can detect characteristic thermal emissions from facial skin to distinguish a mask from a human face. Techniques discussed herein for incorporating output from image segmentation tasks with biometric identification tasks and skin tone biometric analysis tasks enhances accuracy of both biometric identification and liveness detection while eliminating a need for additional 3D or infrared sensors. By configuring the biometric analysis task neural network for multiple biometric tasks as described herein, training datasets can be used that include relatively fewer examples for tasks such as liveness detection to produce good training results with fewer resources expended than if more training images and ground truth were required.

Figure 6:
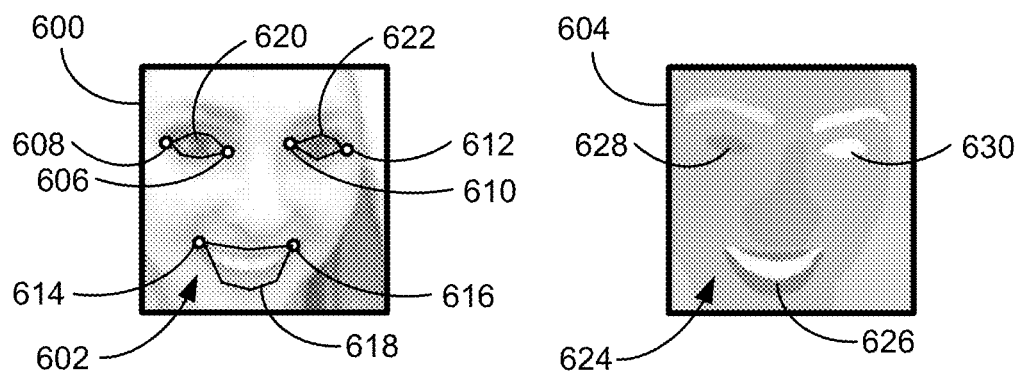
FIG. 6 is a diagram of an example segmented image.

FIG. 6 is a diagram of an image 600 of a human face 602. Image 600 includes landmark locations, indicated by open circles, indicating inside 606 and outside 608 corners of the right eye, inside 610 and outside 612 corners of the left eye, and right 614 and left 616 corners of the mouth. Landmark locations can be determined by DNN 700, 800, discussed in relation to FIGS. 7 and 8, below. Based on the landmark locations, polygons can be constructed indicating the mouth 618, right eye 620, and left eye 622. Polygons based on landmark locations can also be determined by DNN 700, 800, discussed in relation to FIGS. 7 and 8, below. Image 604 includes a segmented 624 version of a human face 602. Segmented 624 version of the human face 602 can also be determined by DNN 700, 800 based on the landmark locations output by common feature extraction CNN 704 of DNN 700, 800.

Segmented 624 version of human face 602 includes image segments indicating the mouth 626, right eye 628, left eye 630. The image segments indicating the mouth 626, right eye 628, left eye 630 indicate the corresponding areas of the human face 602 with higher accuracy than the polygons, i.e., the pixels of the image segments conform more closely to the areas of the facial features in image 600, however segmented 624 version of the human face 602 requires more time and computing resources to determine. Polygons based on landmark locations is a soft target estimate for expected locations of facial features in human face 602. A soft target estimate is a coarse estimate for expected locations of facial features that can be determined quickly using limited computing resources. The soft target estimate can be input to biometric analysis tasks to enhance the computation of the biometric analysis tasks by indicating regions of the image in which to perform processing.

For example, gaze detection, emotion detection, and drowsiness detection can be enhanced by concentrating processing on polygons indicating the eyes 620, 622 and mouth 618 regions of an image 600. Landmark locations which indicate other regions of the human face 602 can be determined such as eyebrows, nose, chin, etc. and polygons based on these additional landmark locations can be input to biometric analysis tasks to enhance processing using limited additional time and processing resources.

Figure 7:
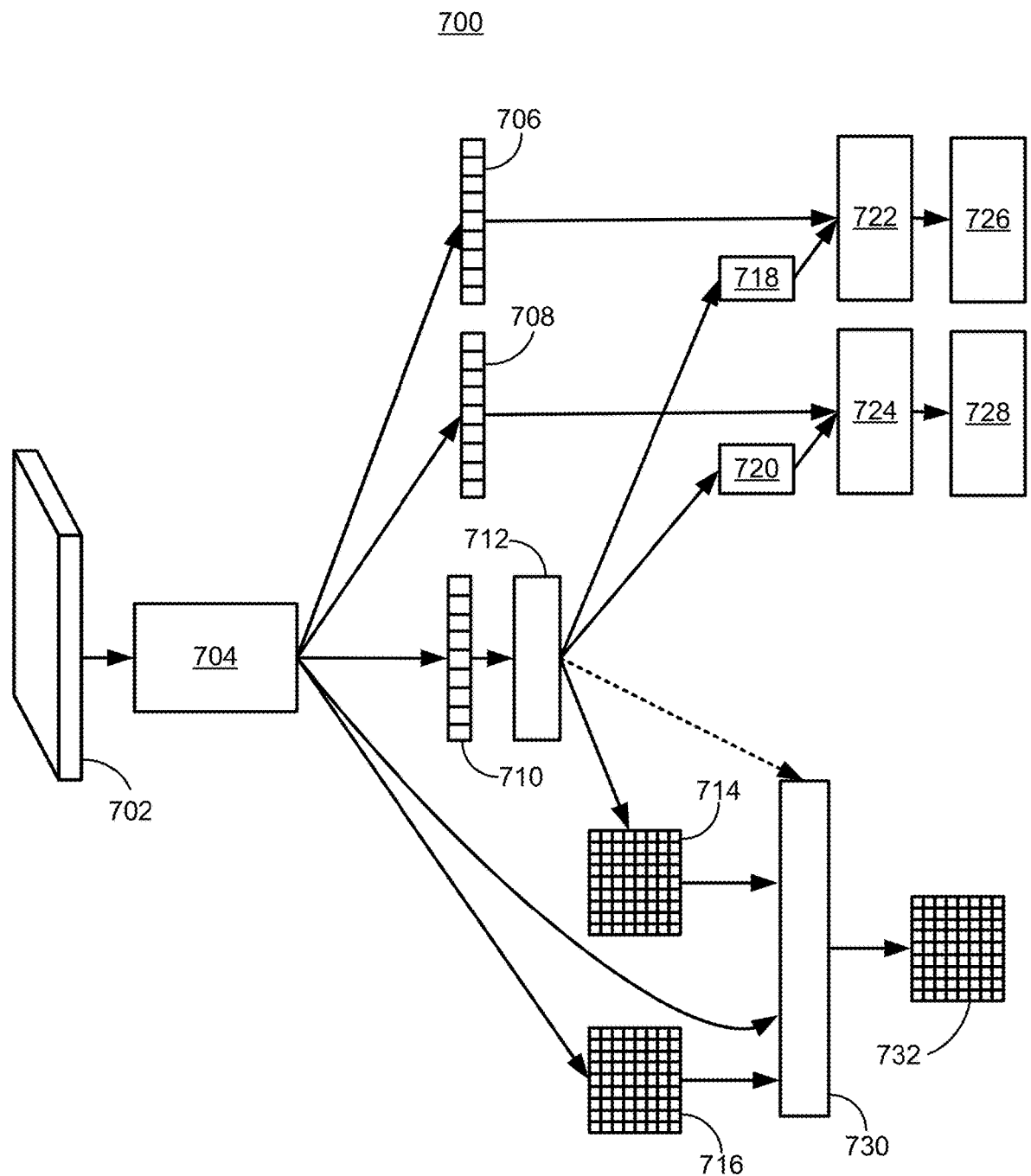
FIG. 7 is a diagram of example multi-task biometric system including facial landmark processing.

FIG. 7 is a diagram of a DNN 700 configured to enhance training and inference over the DNN 400 illustrated in FIG. 4 by combining data from a landmark mesh neural network 710 with output from biometric analysis task neural networks for emotion detection 706 and head pose 708 using expert pooling neural networks 722, 724. DNN 700 inputs an image 702 to a common feature extraction CNN 704. CNN 704 includes a plurality of convolutional layers to determine latent variables indicating facial features determined based on input image 702. Latent variables output from the common feature extraction CNN 704, i.e., facial features, is output to emotion detection 706 and head pose 708 biometric analysis neural networks, first estimate segmentation neural network 716, and landmark mesh neural network 710. Emotion detection 706 and head pose 708 biometric analysis neural networks, first estimate segmentation neural network 716, and landmark mesh neural network 710 include fully connected layers. Landmark mesh neural network 710 determines a landmark mesh based on an input image 702 that includes a human face as discussed in relation to FIG. 6, above. Output landmark mesh is input to a SoftMax function 712 that conditions the landmark mesh output to range from 0 to 1. Output from SoftMax function 712 is input to soft target estimate neural networks 718, 720 which determine polygons for combining with outputs from emotion detection 706 and head pose 708 biometric analysis task neural networks.

The polygons output from soft target estimate neural networks 718, 720 can be selected to conform to polygons expected to the emotion detection 706 and head pose 708 biometric analysis task neural networks. As discussed above, eye polygon, mouth polygons and eyebrow polygons might be expected to emotion detection. Chin polygons, nose polygons, eye polygons and mouth polygons might be expected to emotion detection, for example. Output from emotion detection 706 and head pose 708 biometric analysis neural networks are combined with polygons output from soft target estimate neural networks 718, 720 at expert pooling neural networks 722, 724. Expert pooling neural networks the emotion detection 706 and head pose 708 predictions based on data included in the determined polygons. Predictions output from the expert pooling neural networks 722, 724 can be output at inference time to a computing device 115 in a vehicle 110 to operate the vehicle. At training time, predictions output from expert pooling neural networks 722, 724 are input to SoftMax functions 726, 728 to condition the output to the range between 0 and 1. At training time, output from the SoftMax functions 726, 728 can be input to loss functions to be combined with ground truth data included in the input image 702. The loss functions for the predictions can be combined in a joint loss function to be backpropagated through DNN 700.

Landmark mesh output from SoftMax function 712 can be input to soft target map neural network 714 where the landmark mesh is processed to form an output landmark mesh image that can be input to expert pooling neural network 730 along with latent variables output by common feature extraction CNN 704. In addition, first estimate segmentation neural network 716 receives as input latent variables and outputs a first estimate segmentation map for input image 702. First estimate segmentation map includes a plurality of regions of pixels indicating facial segment classes. Expert pooling neural network 730 combines soft target map, latent variables and first estimate segmentation map to determine a segmentation task prediction 732. At inference time the segmentation task prediction can be used by biometric identification tasks, for example. At training time, segmentation task prediction can be compared to a ground truth segmentation mask to determine a loss function that can be combined with biometric analysis task loss functions to determine a joint loss function to be backpropagated through DNN 700. Training DNN 700 typically takes place on a server computer 120. Following training, DNN 700 can be transmitted to a computing device 115 in a vehicle 110 to perform biometric identification tasks on image data acquired by sensors 116 included the vehicle 110.

Determining a joint loss function can be a function of loss method, task complexity and fusion approach. Loss method is the mathematical technique for determining loss. For example, using mean-squared-error, which calculates differences in pixel counts for facial mask segment outputs vs. ground truth, will generate loss proportional to the number of facial mask segment classes square (i.e., 500$^2$) whereas determining loss using sparse-categorical-cross-entropy, which determines probabilities of presence/absence for facial mask segment outputs vs. ground truth will be proportional to the number of classes (i.e., 14 facial structures). Determining loss values using the wrong technique can result in destructive training interference, where one loss value dominates the joint loss function.

Loss values can be normalized to reflect the task complexity, i.e., more complex tasks can result in greater loss function values. In addition, it can be beneficial to bias the loss towards tasks that behave as inputs to others. A dynamic loss scheme can be used to address this. In a dynamic loss scheme, losses can be normalized to be a 0:1 range based upon loss function complexity, where the loss functions are further weighted by training importance. Early in the training input functions (i.e., semantic segmentation and ID here) can be prioritized by increasing a weight value applied to the loss function. Once their validation accuracy enhances the joint loss function can be weighted towards hard tasks (i.e., anti-spoofing) and then easy tasks such as skin tone based upon further enhancements in validation accuracy. Determining a joint loss function as a function of loss method, task complexity and fusion approach can enhance training of a DNN 700 by increasing the rate at which the training converges on a set of DNN 700 weights that provide minimal joint loss functions over the training dataset. Fusion approach means the manner in which outputs from one task are used as inputs to another task. Increasing the rate at which the training converges decreases the time and computing resources required to train a DNN 700.

In an example of a DNN 700 that performs biometric task analysis, the DNN 700 can be simplified to enhance training and inference by removing soft target map neural network 714 and first estimate segmentation neural network 716. Output from landmark mesh neural network 710 can be input to SoftMax function 712 and output directly to expert pooling neural network 730 (dotted line). Landmark mesh neural network 710 can provide facial feature data for segmentation task prediction 732 without requiring soft target map neural network 714 and first estimate segmentation neural network 716. Configuring DNN 700 to add a connection from landmark mesh Softmax function 712 to expert pooling neural network 730 can reduce computing resources required to train and operate DNN 700. DNN 700 can be trained and operated with and without soft target map neural network 714 and first estimate segmentation neural network 716 to determine whether segmentation task prediction 732 accuracy is maintained. In examples where segmentation task prediction 732 accuracy is maintained, DNN 700 can be enhanced by reducing computational resources required at inference time.

Figure 8:
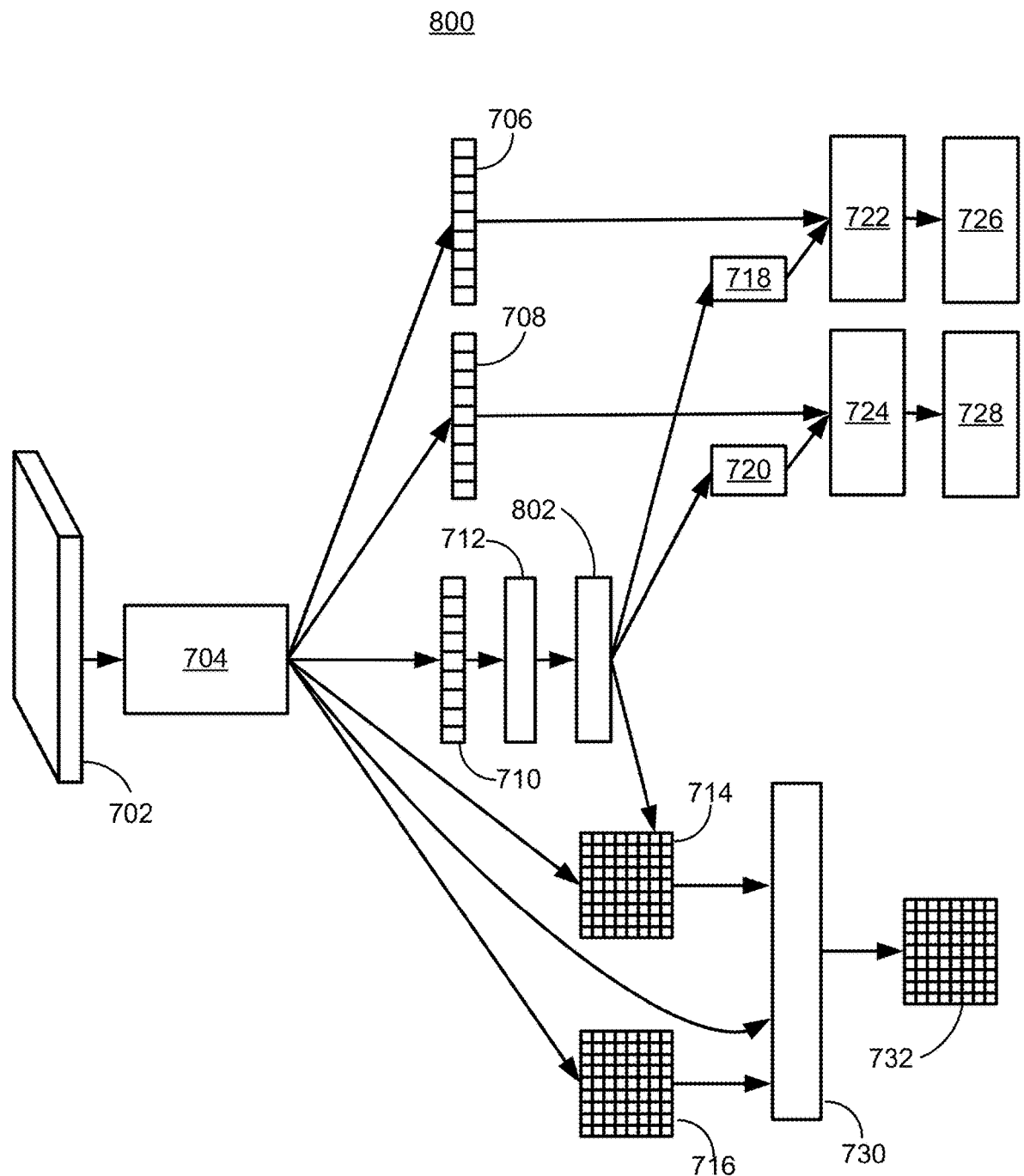
FIG. 8 is a diagram of example multi-task biometric system including facial landmark processing and memory.

FIG. 8 is a diagram of a DNN 800 for performing biometric analysis similarly to DNN 700 in FIG. 7. DNN 800 includes the same components as DNN 700 in FIG. 7 configured in the same fashion except for memory 802 included between output from landmark mesh neural network 710, SoftMax function 712, and inputs to soft target estimate neural networks 718, 720. Memory 802 permits queuing of data from multiple frames of input image 702 data. A DNN 800 can input a sequence of frames of video data that includes a plurality of images 702 of a user's face acquired over a short time period, for example one second or less and determine temporal landmark mesh outputs. For example, the sequence of video frames can include motion of the user's eyes and/or mouth such as eye blinking or lip motions during speech.

Storing temporal image data regarding motion of a user's eyes and mouth can permit DNN 800 to determine biometric analysis tasks such as emotion or head pose with greater accuracy and higher confidence than determining emotion or head pose based on a single static image. DNN 800 can process the temporal data by determining derivatives or calculating optical flow data on the landmark mesh images, for example. Expert pooling neural networks 722, 724 can be configured to determine 3D convolutions by stacking the temporal image data in 3D stacks and using 3D convolution kernels to determine motion in the temporal image data. Memory 802 can be applied to facial features that can be expected to move during the short time sequence input to DNN 800. For example, hair features and skin tones are typically not expected to change over a short time period and therefore would typically not benefit from temporal processing.

A DNN 800 including memory 802 can be trained by video sequences of images 702 including facial feature motion and ground truth data describing the facial feature motion present in the video sequences. For example, video sequences of users blinking and/or speaking can be included in a training database. At training time, the images 702 of the video sequence can be input to DNN 800. Memory 802 can store outputs from the landmark mesh neural network until the video segment ends or a limit on the number of frames of memory is reached. While the memory 802 is being filled, the loss functions based on the emotion detection 706 and head pose 708 biometric analysis neural networks can be set to zero and the weights for emotion detection 706 and head pose 708 biometric analysis neural networks can be frozen. When the video segment ends or the limit on frame storage is reached, the stored temporal data in the memories can be output to soft target estimate neural networks 718, 720 for processing and subsequent output to expert pooling neural networks 722, 724 to determine predictions to be used to output to computing device 115 at inference time and to determine loss functions at training time.

Figure 9:
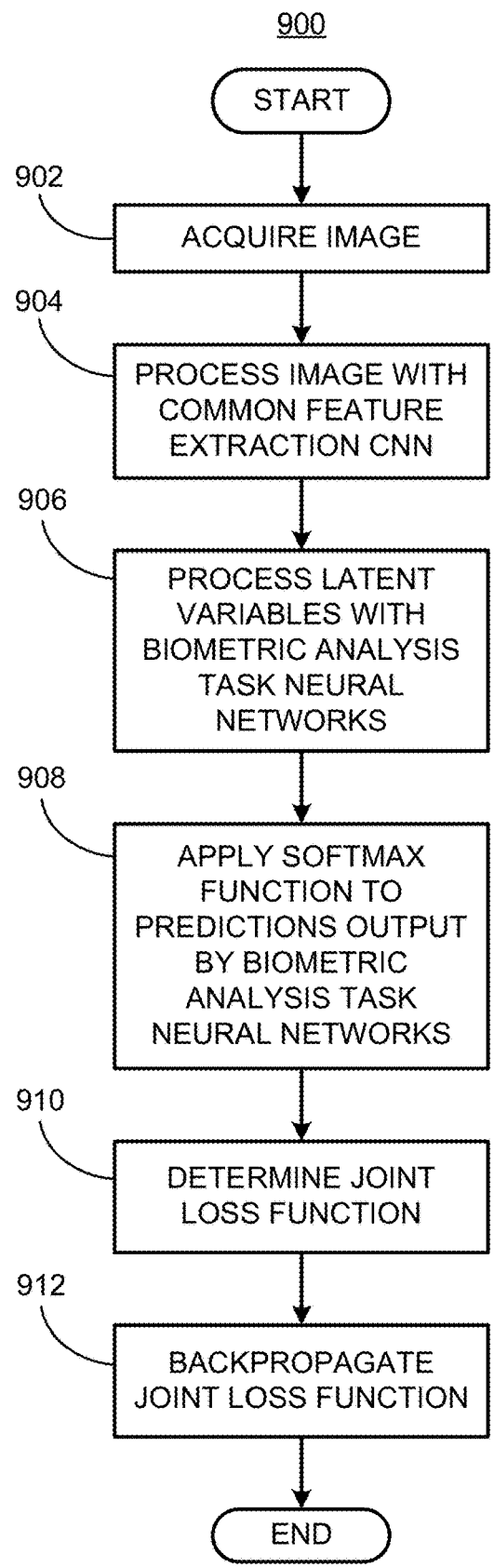
FIG. 9 is a flowchart diagram of an example process to train a deep neural network to perform biometric analysis tasks.

FIG. 9 is a flowchart, described in relation to FIGS. 1-4 of a process 900 for training a DNN 400 including a common feature extraction CNN 410, a plurality of biometric analysis task neural networks 412, 414, 416, 418, 420 and a segmentation neural network 422. Process 900 can be implemented by a processor of a computing device 115 or server computer 120, taking as input image data from sensors 116, 122, executing commands, and outputting biometric analysis task predictions. A DNN 400 is typically executed on a server computer 120 on a traffic infrastructure node 105 at training time and transmitted to a computing device 115 in a vehicle 110 for operation at inference time. Process 900 includes multiple blocks that can be executed in the illustrated order. Process 900 could alternatively or additionally include fewer blocks or can include the blocks executed in different orders.

Process 900 begins at block 902, where an image 402 is acquired from a training dataset. Image 402 includes ground truth for one or more biometric analysis tasks as discussed above in relation to FIG. 3. In examples where ground truth is not available for one or more biometric analysis tasks, the output from the one or more biometric analysis task neural networks 412, 414, 416, 418, 420 or the segmentation neural network 422 can be set to a null value and the weights for the one or more biometric analysis task neural networks 412, 414, 416, 418, 420 or the segmentation neural network 422 can be frozen. Freezing a neural network prevents the weights that program the neural network from being updated based on backpropagating a joint loss function as described below with respect to a block 912, the loss function being determined at block 910 as also described below.

At block 904 the image 402 is input to a common feature extraction CNN 410 to determine facial features to be output as latent variables as discussed in relation to FIG. 4, above.

At block 906 the latent variables are input to a plurality of biometric analysis task neural networks 412, 414, 416, 418, 420 or the segmentation neural network 422 which process the latent variables to determine predictions regarding the input image 402 as discussed above in relation to FIG. 4. At inference time the predictions can be output to a computing device 115 to be used to operate a vehicle 110.

At block 908, the predictions output from biometric analysis task neural networks 412, 414, 416, 418, 420 are input to SoftMax functions 424, 426, 428, 430, 432 to condition the output predictions to be between 0 and 1. Conditioning the output predictions permits the output predictions to be combined at block 910 into a joint loss function without one or more of the output predictions numerically dominating the calculations.

At block 910 the output from the SoftMax functions 424, 426, 428, 430, 432 and the segmentation neural network 422 are combined with ground truth to determine a joint loss function for the DNN 400 in response to an input image 402.

At block 912 the joint loss function can be backpropagated through the layers of the DNN 400 to determine optimal weights for the layers of the DNN 400. Optimal weights are the weights that result in outputs that most closely match the ground truth included in the training dataset. As discussed above in relation to FIG. 4, training DNN 400 includes inputting an input image 402 a plurality of times while varying the weights that program the layers of the DNN 400. Training the DNN 400 includes selecting weights for the layers of DNN 400 that provide the lowest joint loss function for the greatest number of input images 402 in the training dataset. The selected weights are the output resulting from a successful training process 900. Following block 912 process 900 ends.

Figure 10:
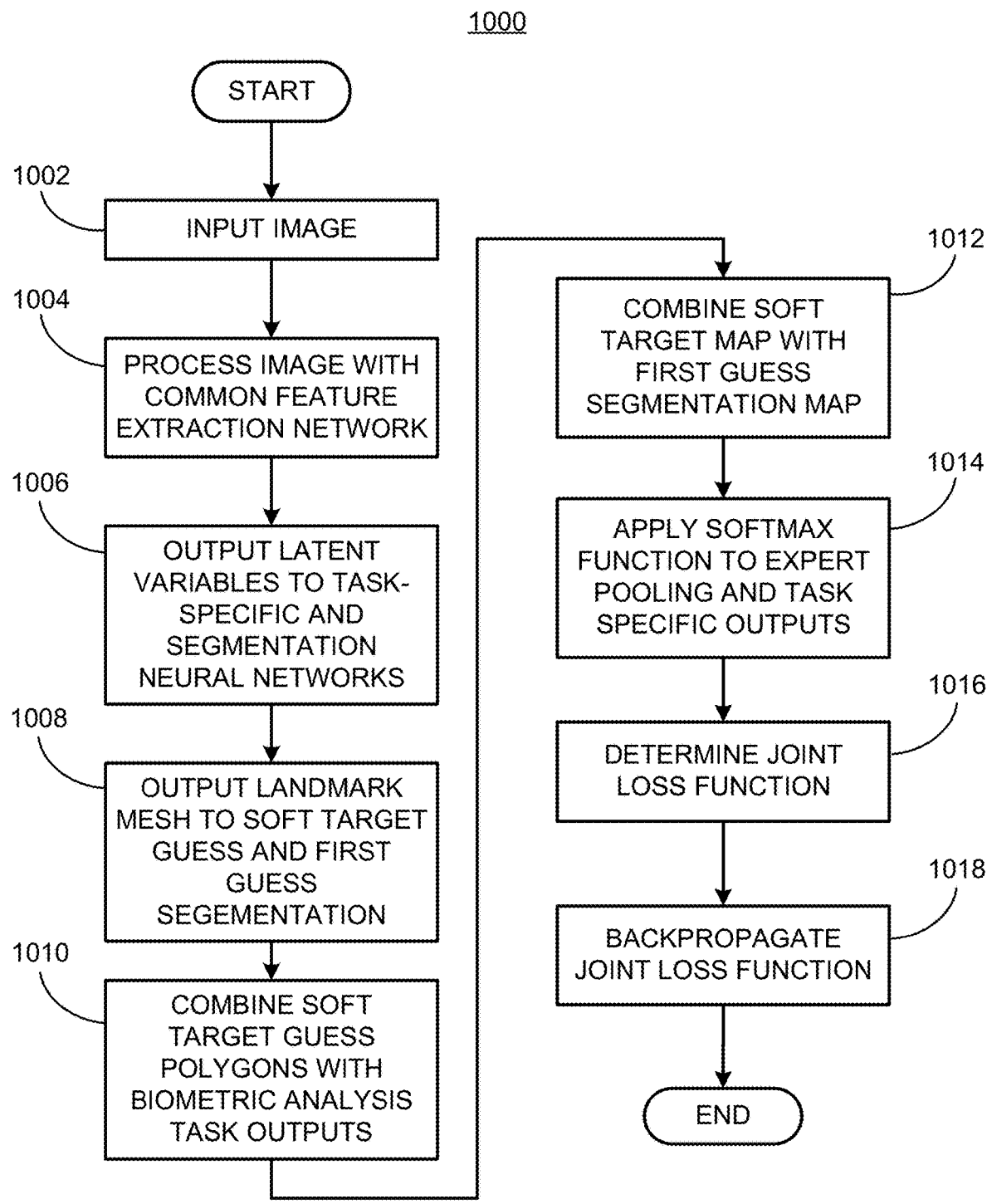
FIG. 10 is a flowchart diagram of an example process to train a deep neural network including facial landmark guess processing and memory to perform biometric tasks.

FIG. 10 is a flowchart, described in relation to FIGS. 1-9, of a process 1000 for training a DNN 700, 800 including a common feature extraction CNN 704, emotion detection 706 and head pose 708 biometric analysis task neural networks, a first estimate segmentation neural network 716 and a landmark mesh neural network 710. Process 1000 can be implemented by a processor of a computing device 115 or server computer 120, taking as input image data from sensors 116, 122, executing commands, and outputting biometric analysis task predictions. A DNN 700, 800 is typically executed on a server computer 120 on a traffic infrastructure node 105 at training time and transmitted to a computing device 115 in a vehicle 110 for operation at inference time. Process 1000 could alternatively or additionally include fewer blocks or can include the blocks executed in different orders.

Process 1000 begins at block 1002, where an image 702 is acquired from a training dataset. Image 702 includes ground truth for one or more biometric analysis tasks as discussed above in relation to FIGS. 7 and 8. In examples where ground truth is not available for one or more biometric analysis tasks, the output from the one or more biometric analysis tasks can be set to a null value and the weights for the one or more biometric analysis tasks can be frozen to prevent them from being updated based on a joint loss function determined based on the outputs from the biometric analysis tasks.

At block 1004 the image 702 is input to a common feature extraction CNN 704 to determine facial features to be output as latent variables as discussed in relation to FIGS. 7 and 8, above.

At block 1006 the latent variables are input to emotion detection 706 and head pose 708 biometric analysis task neural networks and a first estimate segmentation neural network 716 which process the latent variables to determine first predictions regarding the biometric analysis tasks and facial feature segmentation tasks. Latent variables are also input to landmark mesh neural network 710 which determines facial feature landmarks. Landmark mesh output is input to a SoftMax function 712. In DNN 800, output from landmark mesh SoftMax function 712 is input to a memory 802, where output from a plurality of input images 702 can be stored and output as a stack of landmark mesh outputs.

At block 1008 the output from the landmark mesh SoftMax function 712 is combined with latent variables from common feature extraction CNN 704 determine a soft target map neural network 714 where the landmark mesh is processed to form an output landmark mesh image. Output from the landmark mesh SoftMax function 712 is also input to soft target estimate neural networks 718, 720 to determine facial feature polygons. In DNN 800 a stack of landmark mesh outputs is input to soft target estimate neural networks to form a stack of soft target estimate polygons.

At block 1010 the soft target estimate polygons output from soft target estimate neural networks 718, 720 are combined with output from emotion detection and head pose expert pooling neural networks 722, 724, respectively to determine predictions regarding emotion detection and head pose, At block 1012 the outputs from soft target map neural network 714, latent variables output from common feature extraction CNN 704 and first estimate segmentation neural network 716 are input to expert pooling neural network 730 to determine a segmentation task prediction 732. At inference time segmentation task prediction 732 can be output to computing device 115 to be combined with other outputs to perform biometric identification, for example.

At block 1014, at training time, predictions output from expert pooling neural networks 722, 724 are input to SoftMax functions 726, 728, respectively. Softmax functions condition the output predictions to be between 0 and 1.

At block 1016 the outputs from the SoftMax functions 726, 728 and segmentation task prediction 732 are combined with ground truth to determine loss functions which are then combined with to yield a joint loss function. The individual loss functions can be summed to form a joint loss function, for example.

At block 1018 the joint loss function can be backpropagated through the layers of the DNN 700, 800 to determine optimal weights for the layers of the DNN 700. Optimal weights are the selected weights that result in outputs that most closely match the ground truth included in the training dataset. The selected weights are the output resulting from a successful training process 1000. Following block 1018 process 1000 ends.

Figure 11:
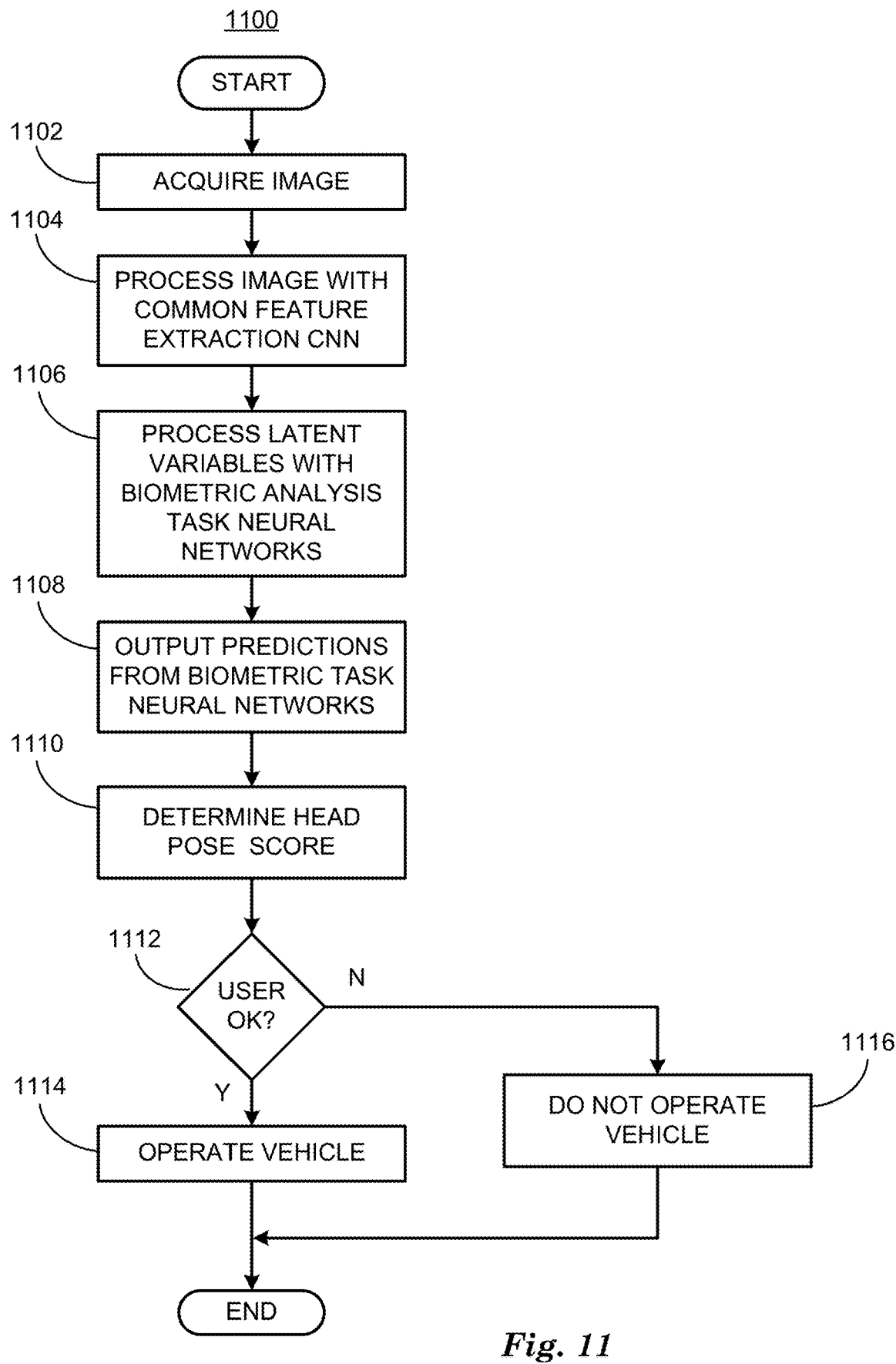
FIG. 11 is a flowchart diagram of an example process for performing biometric tasks in operation of a vehicle.

FIG. 11 is a flowchart, described in relation to FIGS. 1-7, of a process 1100 for operating a vehicle based at least in part on biometric tasks. The process 1100 includes performing emotion detection and head pose biometric analysis tasks and image segmentation with a DNN 700 including a common feature extraction CNN 410, a head pose 708 biometric analysis task neural network for determining a head pose prediction, an emotion detection 706 biometric analysis neural network and segmentation task prediction 732 for an image segmentation prediction. Process 1100 can be implemented by a processor of a computing device 115 or server computer 120, taking as input image data from sensors 116, 122, executing commands, and outputting biometric analysis task predictions. Process 1100 could alternatively or additionally include fewer blocks or can include the blocks executed in different orders.

Following training a DNN 700 as discussed above in relation to FIG. 7, the trained DNN 700 can be transmitted to a computing device 115 in a device such as a vehicle 110 for inference. As discussed above in relation to FIG. 7, DNN 700 can be trained with emotion detection 706 and head pose 708 biometric analysis task neural networks landmark mesh neural network 710. At inference time, the DNN 700 can be reduced to only include biometric analysis task neural networks that pertain to a specific task or tasks. In this example, the DNN 700 will be used for head pose detection and will include head pose 708 biometric analysis task neural network and landmark mesh neural network 710. Reconfiguring the DNN 700 in this fashion permits training the DNN 700 with a large and varied training dataset that includes training images and ground truth for a plurality of biometric analysis tasks, while providing a lightweight DNN 700 that saves computer resources including memory space and execution time at inference time.

Process 1100 begins at block 1102 where the vehicle 110 acquires an image 702 using a sensor 116 included in the vehicle 110. Process 1100 could also be implemented in a security system, a robot guidance system, or a handheld device such as a cell phone that seeks to determine the identity of a potential user before granting access to a device.

At block 1104 the computing device 115 inputs the image 702 to the common feature extraction CNN 410 to determine facial features to output as latent variables.

At block 1106 the latent variables are input to head pose 708 neural network and landmark mesh neural network 710 to determine predictions regarding the head pose of the user imaged in input image 702.

At block 1108 the prediction regarding head pose is output from DNN 700 to the computing device 115 in the vehicle 110.

At block 1110 the computing device 115 determines a head pose score for the user in the image 702. Computing device 115 can determine a probability that the head pose prediction output by DNN 700 is within tolerance for operation of the vehicle 110, i.e., is the user asleep or otherwise not paying attention to the task.

At block 1112 the computing device 115 tests the head pose score from block 1110. If the head pose score is greater than a user-specified threshold, the user is authenticated and process 1100 passes to block 1114. The threshold can be determined by processing a plurality of input images 702 that include head poses that are determined by uses to be acceptable and head poses that are determined by users to be unacceptable. Distributions of head pose scores for acceptable and unacceptable head poses can be determined and a threshold that separates the two distributions can be determined. If the head pose score is lower than the user-specified threshold the user fails authentication and process 1100 branches to block 1116.

At block 1114 the user has passed head pose and the user is granted permission to operate the vehicle 110. This can include unlocking doors to permit entry to the vehicle 110 and turning on the vehicle 110 controls to permit the user to operate the vehicle 110, granting the user permission to operate various vehicle components, such as climate control, infotainment, etc., to name a few examples. Following block 1114 process 1100 ends.

At block 1116 the user has failed head pose authentication and permission to operate the vehicle can be revoked. This can result in an alert being sounded or the vehicle stopping, for example. Following block 1116 the process 1100 ends.

Computing devices such as those discussed herein generally each includes commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Python, *Julia*, SCALA, Visual Basic, Java Script, Perl, HTML, etc. In general, a processor (i.e., a microprocessor) receives commands, i.e., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium (also referred to as a processor-readable medium) includes any non-transitory (i.e., tangible) medium that participates in providing data (i.e., instructions) that may be read by a computer (i.e., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, i.e., a reference to an "exemplary widget" should be read as simply referring to an example of a widget.

The adverb "approximately" modifying a value or result means that a shape, structure, measurement, value, determination, calculation, etc. may deviate from an exactly

The invention claimed is:

1. A system, comprising:
a computer that includes a processor and a memory, the memory including instructions executable by the processor to provide output from a selected biometric analysis task that is one of a plurality of biometric analysis tasks, based on an image provided from an image sensor;
wherein the selected biometric analysis task is performed in a deep neural network that includes a common feature extraction neural network, a plurality of biometric task-specific neural networks, a segmentation neural network, a landmark mesh neural network, a plurality of soft target segmentation neural networks, and a plurality of expert pooling neural networks that perform the plurality of biometric analysis tasks by:
inputting the image to the common feature extraction network to determine latent variables;
inputting the latent variables to the plurality of biometric task-specific neural networks including emotion detection and head pose to determine a plurality of first biometric analysis task outputs;
inputting the latent variables to a landmark mesh neural network to determine a landmark mesh that includes polygons based on landmark locations that indicate features of a human face;
inputting the landmark mesh and the first biometric task outputs to a plurality of expert pooling neural networks to determine a plurality of second biometric task outputs; and
training the deep neural network by:
determining one or more first loss functions based on the plurality of second biometric task outputs;
combining the first loss functions to determine a joint loss function that gives more weight to loss functions for biometric tasks that include larger training datasets than biometric tasks that include smaller training datasets; and
backpropagating the one or more first loss function and the joint loss function back through the deep neural network.

2. The system of claim 1, the instructions including further instructions to perform the plurality of biometric tasks by:
inputting the latent variables to the segmentation neural network to determine a first estimate segmentation map;
inputting the landmark mesh to the plurality of soft target segmentation neural networks to determine a plurality of soft target estimates; and
inputting the first estimate segmentation map and the plurality of soft target estimates to an expert pooling neural network to determine a segmentation prediction.

3. The system of claim 1, wherein the output from the landmark mesh neural network is stored in a memory and processed to determine temporal data regarding one or more image segments.

4. The system of claim 1, further comprising a device, wherein the instructions include instructions to operate the device based on the output from the deep neural network according to the selected biometric analysis task.

5. The system of claim 1, wherein the biometric analysis tasks include biometric identification, liveliness, and facial segmentation.

6. The system of claim 1, wherein the common feature extraction neural network includes a plurality of convolutional layers.

7. The system of claim 1, wherein the plurality of task-specific neural networks includes a plurality of fully connected layers.

8. The system of claim 1, wherein the segmentation neural network, the landmark mesh neural network, and the plurality of expert pooling neural networks include a plurality of fully connected layers.

9. The system of claim 1, wherein the outputs from the plurality of task-specific neural networks are input to a Softmax function before being combined with the outputs from the common feature extraction neural network.

10. The system of claim 1, wherein the outputs from the common feature extraction neural network are combined with the soft target estimates using expert pooling.

11. The system of claim 1, wherein output from the expert pooling are input to a Softmax function before being combined to determine the first loss functions.

12. The system of claim 1, wherein one or more outputs from the plurality of task-specific neural networks are set to zero during training.

13. A method, comprising:
providing output from a selected biometric analysis task that is one of a plurality of biometric analysis tasks, based on an image provided from an image sensor;
wherein the selected biometric analysis task is performed in a deep neural network that includes a common feature extraction neural network, a plurality of biometric task-specific neural networks, a segmentation neural network, a landmark mesh neural network, a plurality of soft target segmentation neural networks, and a plurality of expert pooling neural networks that perform the plurality of biometric analysis tasks by:
inputting the image to the common feature extraction network to determine latent variables;
inputting the latent variables to the plurality of biometric task-specific neural networks including emotion detection and head pose to determine a plurality of first biometric analysis task outputs;
inputting the latent variables to a landmark mesh neural network to determine a landmark mesh that includes polygons based on landmark locations that indicate features of a human face;
inputting the landmark mesh and the first biometric task outputs to a plurality of expert pooling neural networks to determine a plurality of second biometric task outputs;

training the deep neural network by:
- determining one or more first loss functions based on the plurality of second biometric task outputs;
- combining the first loss functions to determine a joint loss function that gives more weight to loss functions for biometric tasks that include larger training datasets than biometric tasks that include smaller training datasets; and
- backpropagating the one or more first loss function and the joint loss function back through the deep neural network.

14. The method of claim 13, further comprising:
inputting the latent variables to the segmentation neural network to determine a first estimate segmentation map;
inputting the landmark mesh to the plurality of soft target segmentation neural networks to determine a plurality of soft target estimates; and
inputting the first estimate segmentation map and the plurality of soft target estimates to an expert pooling neural network to determine a segmentation prediction.

15. The method of claim 13, wherein the output from the landmark mesh neural network is stored in a memory and processed to determine temporal data regarding one or more image segments.

16. The method of claim 13, further comprising a device, wherein the device is operated based on the output from the deep neural network according to the selected biometric analysis task.

17. The method of claim 13, wherein the biometric analysis tasks include biometric identification, liveliness, and facial segmentation.

18. The method of claim 13, wherein the common feature extraction neural network includes a plurality of convolutional layers.

19. The method of claim 13, wherein the plurality of task-specific neural networks includes a plurality of fully connected layers.

20. The method of claim 13, wherein the segmentation neural network, the landmark mesh neural network, and the plurality of expert pooling neural networks include a plurality of fully connected layers.

* * * * *